Patented Dec. 22, 1931

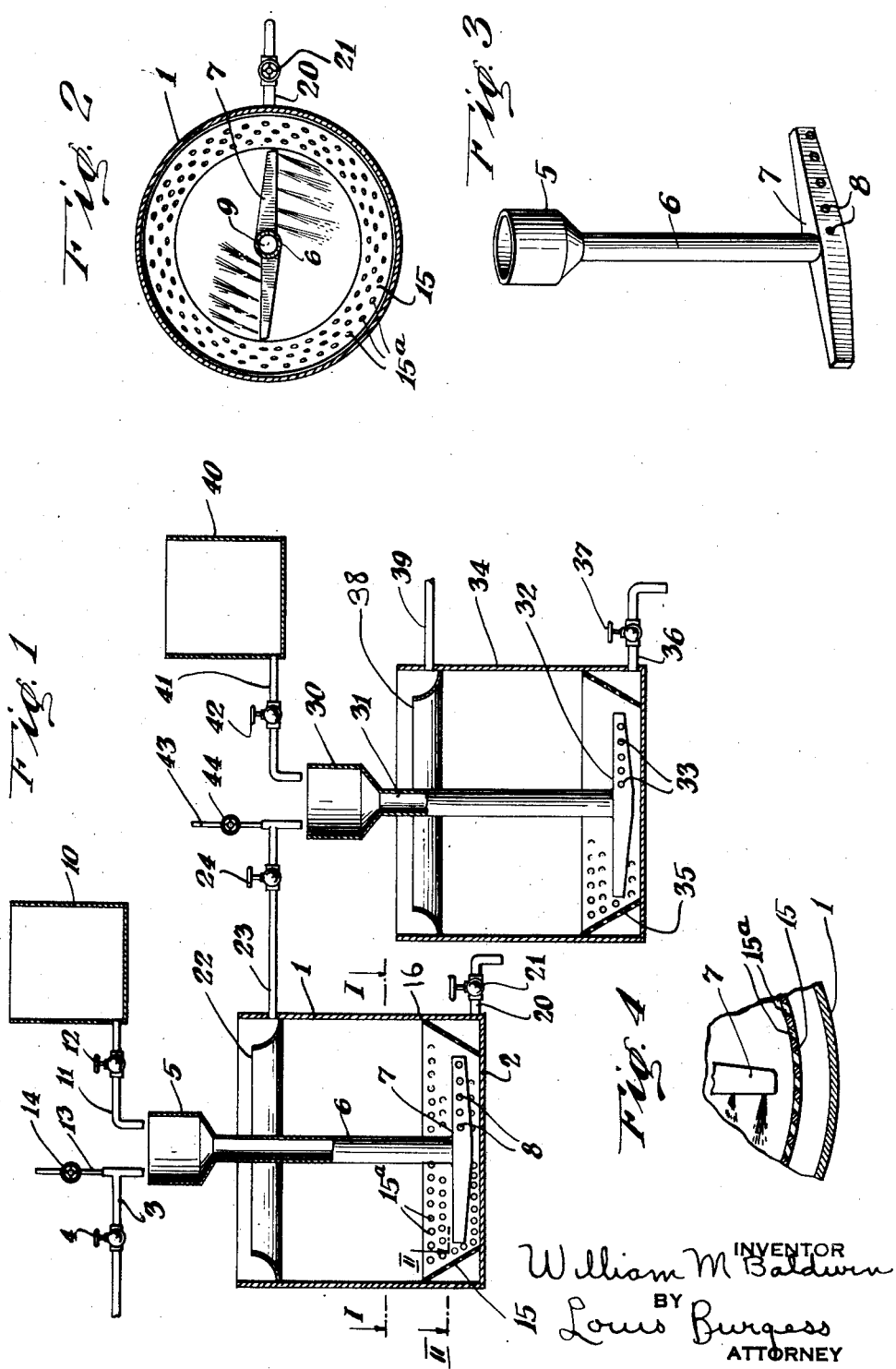

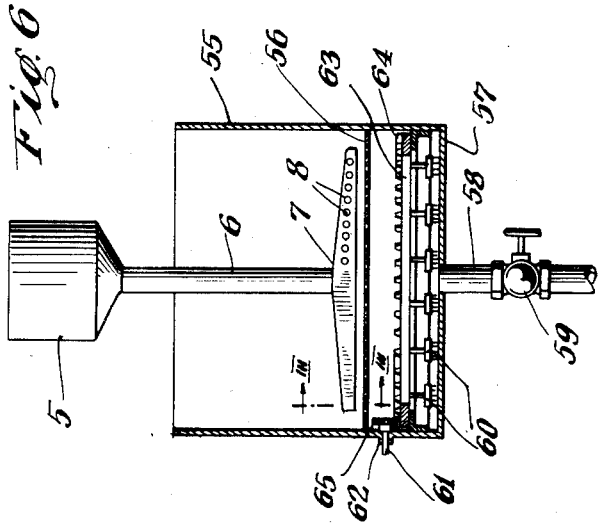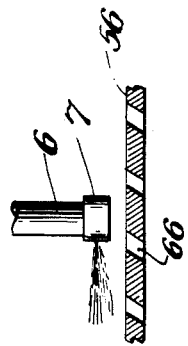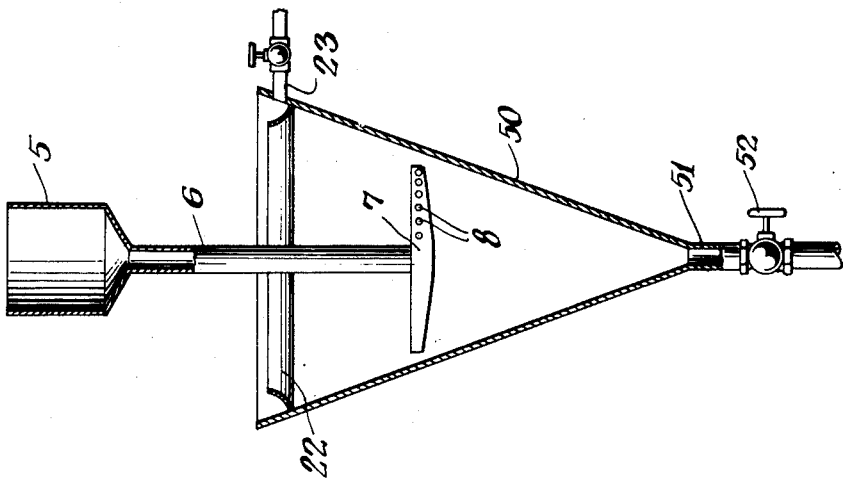

1,837,191

UNITED STATES PATENT OFFICE

WILLIAM M. BALDWIN, OF GARDEN CITY, NEW YORK

APPARATUS FOR SEPARATING SOLIDS FROM LIQUIDS IN WHICH SAID SOLIDS ARE SUSPENDED

Application filed January 22, 1930. Serial No. 422,595.

My apparatus is particularly applicable to the treatment of large quantities of liquid such as the clarification of water for industrial purposes, boilers, etc.; and to the removal of solids suspended in plant and municipal effluent waters. In its elementary form, my apparatus comprises a stationary receptacle, an inlet for the liquid to be purified adjacent the bottom thereof, means for communicating a swirling movement in a horizontal plane to the said liquid, and an overflow adjacent the upper part thereof. This automatically results in throwing the suspended particles to the periphery of the receptacle, and thereby effecting a separation thereof. I may remove the separated particles periodically or continuously, and for that purpose preferably provide a draw-off for such separated particles. While this draw-off may be local to some section of the receptacle, it is preferably so formed that the separated particles are bled from a considerable area. Means for this purpose may, for example, take the form of a perforated bottom and/or a perforated side in the receptacle.

The perforations in such case should be relatively small so as to permit of a uniform distributed flow which would carry away from the receptacle a slurry of solids suspended in liquid representing a mixture very substantially richer in solids than is supplied to the apparatus. A draw-off is provided for conducting away this slurry which passes through the said perforations, and I find it good practice to make the total cross-sectional area of the perforations in the bottom and/or side of the receptacle approximately equal to the cross-sectional area of the draw-off. The bleeding means for particles thrown out may be in the form of the frustum of a cone preferably adjacent the lower part of the receptacle, although the result may be obtained by means of a perforated pipe extending around the bottom of the receptacle. Such pipe should communicate with the receptacle only through the perforations, and such perforations should be substantially equal in total cross-sectional area to the total cross-sectional area of the pipe. While the particles abstracted by the bleeder may be discharged through the bottom or side of the receptacle, it will be apparent that the discharge may be taken off by means of a pipe extending out of the top of the receptacle and operated by a pump or any similar device for maintaining the perforations under suction.

In the preferred form of my apparatus, the swirling movement of the liquid is created by discharging the liquid to be clarified into the receptacle in a tangential manner. I find that a particularly convenient apparatus for this purpose includes a riser and a stationary distributor connected thereto having outlet ports suitably disposed so that the swirling of the liquid in the receptacle is accomplished by the hydrostatic head furnished by the riser. The riser functions in addition as a mixing column for a clarifying agent, where the addition of such clarifying agent is desirable.

The apparatus will be fully understood from the following description read in conjunction with the drawings, in which, Fig. 1 is a vertical section through a preferred form of my apparatus.

Fig. 2 is a horizontal section through part of Fig. 1 on the plane denoted by the line I—I.

Fig. 3 is a perspective view of a part of Fig. 1.

Fig. 4 is a detail view of a part of Fig. 1 on the plane denoted by the line II—II.

Fig. 5 is a vertical section through an alternative form of apparatus.

Fig. 6 is a vertical section through a further alternative form of apparatus, and Fig. 7 is a detail view of part of Fig. 6.

Referring to Fig. 1, the numeral 1 denotes a receptacle which may have any horizontal section but is preferably circular in this respect. While the receptacle shown is of rectangular vertical section, a variety of other forms may be employed, for example, the receptacle may have the general form of the frustum of a cone with the vertex uppermost, or conversely. The receptacle may also have the general form of a parallelepipedon. This receptacle may have an open top but is closed at the bottom by 2. The liquid to be clarified is introduced through pipe 3, controlled by valve 4, to funnel 5. This funnel is connected to riser 6 which is in turn connected to distributor 7. This distributor has outlet ports 8 which are tangentially directed as will be apparent from Fig. 2. The tangential outlets 8 do not oppose ease other, but are pointed in the same direction with respect to the center 9, (Fig. 2) so as to impart a swirling motion to liquid in 1. While I have shown outlet ports consisting of nozzles or perforations, I am not to be limited to this type as I may alternatively employ a slot or any other device for discharging liquid containing suspended solids in receptacle 1. While, of course, the liquid may be pumped or forced into distributor 7 in any manner, the riser 6 is for many purposes preferable, inasmuch as it renders it unnecessary to pump the liquid and it is also possible wherever desired to add a clarifying and/or precipitating agent to the liquid in riser 6, so that this riser functions in addition as a mixing column.

This is a particularly efficacious method of mixing and promotes the separation of the dispersed solids for the liquid. This clarifying agent may, for example, be stored in tank 10 and introduced to funnel 5, through pipe 11, controlled by valve 12. I may, for example, employ for clarifying industrial and boiler waters a reagent yielding aluminum hydroxide such as aluminum sulphate or sodium aluminate. Where it is necessary to introduce a second material to make the clarifying agent effective if lime or soda ash, this may be done by means of pipe 13, controlled by valve 14. Another reagent suitable for certain types of suspensions is tri-sodium phosphate. While I have referred to liquids containing suspended solids, the suspended solids may be formed in the liquid as a precipitate, and in this case the precipitating agent may be stored in tank 10 and fed to funnel 5, through pipe 11, controlled by valve 12. The swirling action of the liquid in 1, induced by the discharge from ports 8, would of itself tend to throw the dispersed solids toward the periphery of the tank so that these solids would there accumulate for subsequent removal.

This swirling action should be of such an order or velocity as to result in throwing the solids out of the bulk of the liquid by the centrifugal force thereby produced. For this reason, the degree of swirling must be controlled in accordance with the nature of the suspension treated and must be adequate for this purpose. With relatively coarse solids and a liquid of low viscosity, a low rotational speed may be sufficient; whereas with more finely divided solids or a more viscous liquid, a higher rotational speed may be necessary. I may state generally that I have found peripheral speeds in excess of 25 feet per minute to be desirable. I find it desirable to facilitate the separation of the suspended particles by the use of a bleeder or member containing a multiplicity of relatively small perforations 15ª such as the annulus 15 of frusto conical shape extending from the bottom 2 of tank 1 up to point 16 on the side wall thereof. As previously stated, these perforations are relatively small, designed to pass a limited flow consisting of a slurry substantially enriched in solids over the liquid supplied to receptacle 1. This slurry is withdrawn from the system by means of draw-off 20, controlled by valve 21, and the cross-sectional area of 20 is preferably substantially equal to the total cross-sectional area of the said perforations. By reference to the detail sectional view, Fig. 4, it will be further noted that the perforations slant in the general direction of rotation of the liquid, and this feature further facilitates the separation of solid from liquid.

It is a further feature of my invention that the bleeder is located at approximately the level at which the liquid is introduced to the system, so that the particles to be separated may pass out of the system by the shortest possible course. While the inlet and bleeder shown in Fig. 1 are located adjacent the bottom of the tank, the said feature might be otherwise embodied, and the inlet and bleeder might, for example, be located otherwise than adjacent the bottom of the tank. In this case it would, of course, be desirable for the inlet and bleeder to be disposed at approximately the same level. I may provide a number of draw-offs such as 20 distributed about the periphery of the tank, and/or I may provide a mechanical means such as a rake for bringing accumulated solids adjacent the point or points of withdrawal. An overflow is preferably provided adjacent the upper part of the tank and this is preferably in the form of an annular spill over device 22, so that liquid is taken off uniformly from the entire upper surface thereof. This liquid is conducted away through a pipe such as 23, controlled by valve 24.

In many cases, I find it desirable to employ two or more such units in series. In this case, the pipe 23 discharges into funnel 30, connected to riser 31, which is in turn connected to distributor 32. Elements 30, 31 and 32 are similar to elements 5, 6, and 7, heretofore described. Distributor 32 is provided with tangential discharge ports 33, and is located in the lower part of tank 34. Tank 24 carries annular bleeder 35 similar to 15 previously described. Outlet 36 controlled by valve 37 is provided for separated solids. Spill over 38 is provided for liquid adjacent the upper part of the receptacle 34. The clarified liquid may be conducted away through pipe 39 for use or for a subsequent clarifying operation. If desired, clarifying agent may be kept in tank 40 and supplied through pipe 41, controlled by valve 42 to the liquid riser 31, and where a reagent is necessary or desirable in combination with the clarifying agent, it may be added through pipe 43, controlled by valve 44.

Where two or more units are operated in series a variety of effects may be obtained, for example, a clarifying agent may be stored in tank 10 and added to the liquid to be treated in receptacle 1; and a second or different clarifying agent may be stored in tank 40 to be admixed with the liquid in receptacle 34. Alternatively, a clarifying agent may be admixed with the liquid in receptacle 1 and a precipitant may be admixed with the liquid in receptacle 34. Separate and distinct precipitating agents may be admixed in series for the purpose of selectively removing different components of the liquid in two or more stages. Clarifying and precipitating agents will be designated in the claims by the general term clarifying agent.

In Fig. 5, I have shown an alternative form of apparatus in which the receptacle is of frusto conical shape with the vertex adjacent the lower extremity. With this type of apparatus no bleeder for separated particles is required as the particles settle into the lower portion of the receptacle 50, and may be continuously or periodically withdrawn through pipe 51, controlled by valve 52.

A further alternative form is shown in Fig. 6. In this apparatus the receptacle 55 is provided with a bleeder 56 which is in the form of a horizontal perforated partition spanning the lower part of the receptacle. The bottom 57 of this receptacle may be conical in form, discharging the separated solids to outlet 58, controlled by valve 59; or alternatively a system of rakes 60 may be employed for driving the particles toward the outlet. Any suitable means for rotating this system of rakes may be employed as, for example, shaft 61 driven by suitable means not shown entering receptacle 55, through stuffing-box 62 and actuating the member 63 to which the rakes are attached through the medium of gear teeth 64 and pinion gear 65. As shown in detail, Fig. 6, which is a vertical section through 63 facing the end of distributor 7, the perforations 66 in partition 56 slant in the general direction of rotation of the liquid in receptacle 55.

The apparatus which I have invented has been found highly efficient in operation, inexpensive to construct, and may be constructed without moving parts. The mode of operation thereof will be apparent from the foregoing description. The apparatus may, of course, be constructed in other forms than that specifically described, and for that reason it is my intention that the invention be limited only by the appended claims or their equivalents in which I have endeavored to claim broadly all inherent novelty.

I claim:
1. Apparatus for separating solids from liquids in which said solids are suspended, comprising a stationary receptacle, means for introducing a liquid containing suspended solids into said receptacle adjacent the lower part thereof, means for communicating a rotational movement in a horizontal plane to the liquid in said receptacle, a perforated bleeder surrounding said means for communicating a rotational movement, and an overflow adjacent the upper part of said receptacle.

2. Apparatus for separating solids from liquids in which said solids are suspended, comprising a stationary receptacle, means for introducing a liquid containing suspended solids into said receptacle adjacent the lower part thereof, means for communicating a rotational movement in a horizontal plane to the liquid in said receptacle, a frusto conical perforated bleeder surrounding said means for communicating a rotational movement, and an overflow adjacent the upper part of said receptacle.

3. Apparatus for separating solids from liquids in which said solids are suspended, comprising a stationary receptacle, a distributor in said receptacle, means for introducing a liquid containing suspended solids to said receptacle through said distributor, tangentially disposed outlet ports on said distributor adapted to communicate a rotational movement in a horizontal plane to liquid in said receptacle, a perforated bleeder surrounding said tangentially disposed outlet ports, and an overflow adjacent the upper part of said receptacle.

4. Apparatus for separating solids from liquids in which said solids are suspended, comprising a stationary receptacle, a distributor in said receptacle, means for introducing a liquid containing suspended solids to said receptacle through said distributor, tangentially disposed outlet ports on said distributor adapted to communicate a rotational movement in a horizontal plane to liquid in said receptacle, a frusto conical perforated bleeder surrounding said tangentially disposed outlet ports, and an overflow adjacent the upper part of said receptacle.

WILLIAM M. BALDWIN.